Jan. 13, 1959
G. W. HAAFF
2,868,356
CATERPILLAR TYPE DRIVE FOR CONVEYOR CHAIN
Filed Nov. 2, 1954
2 Sheets-Sheet 1
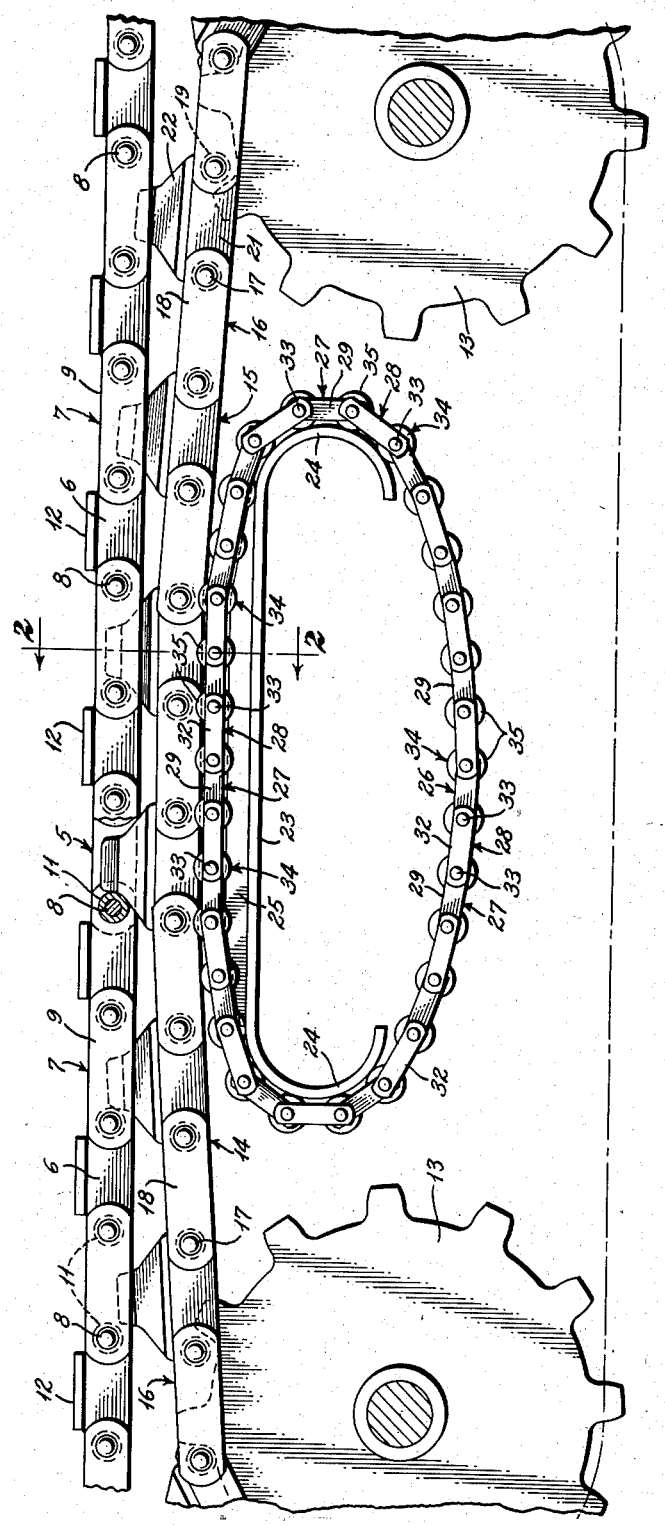

Jan. 13, 1959 G. W. HAAFF 2,868,356
CATERPILLAR TYPE DRIVE FOR CONVEYOR CHAIN
Filed Nov. 2, 1954 2 Sheets-Sheet 2

United States Patent Office 2,868,356
Patented Jan. 13, 1959

2,868,356

CATERPILLAR TYPE DRIVE FOR CONVEYOR CHAIN

George W. Haaff, Indianapolis, Ind., assignor to Link-Belt Company, a corporation of Illinois Application November 2, 1954, Serial No. 466,284

5 Claims. (Cl. 198—203)

This invention relates to new and useful improvements in drives for conveyor chains and deals more particularly with apparatus for supporting the active runs of caterpillar type drive chains in operative engagement with conveyor chains.

A conventional type of caterpillar drive unit employs a drive chain that is trained over two or more sprockets which are arranged so that the driving dogs of the active run of the chain may be positioned in operative engagement with the conveyor chain. The active run of the drive chain is supported in driving engagement with the conveyor chain by a back-up plate or bar which may directly engage the side bars of the links of the drive chain, in which case pressure is applied to the drive chain by the reactions from the conveyor chain resulting in sliding frictional engagement between the side bars of the drive chain and the back-up plate. In other instances, rollers on the pins connecting the links of the drive chain are engaged by a back-up plate so that the resulting pressure between the rollers and the connecting pins causes sliding frictional resistance in the drive chain joint. The pressure applied to the drive chain causes a rolling frictional engagement between the rollers and the plate.

In both of the above mentioned types of engagement between the back-up plate and the drive chain, or its components, the frictional engagement materially reduces the efficiency of the drive, particularly in those instances where a substantial amount of pressure is transmitted through the drive chain to the back-up plate.

It is the primary object of this invention to provide a back-up structure for holding the chain of a caterpillar type drive in operative engagement with the associated conveyor chain in such a manner as to eliminate all sliding frictional engagement between said chain and structure.

A further important object of the invention is to provide a caterpillar type drive including a chain which is entirely supported in its active run only by an anti-friction type of back-up structure.

A further important object of the invention is to provide a caterpillar type drive having a drive chain the opposite side bars of which are independently supported by rolling engagement only with its back-up structure.

Other objects and advantages of the invention will be apparent during the course of the following description.

Figure 2:
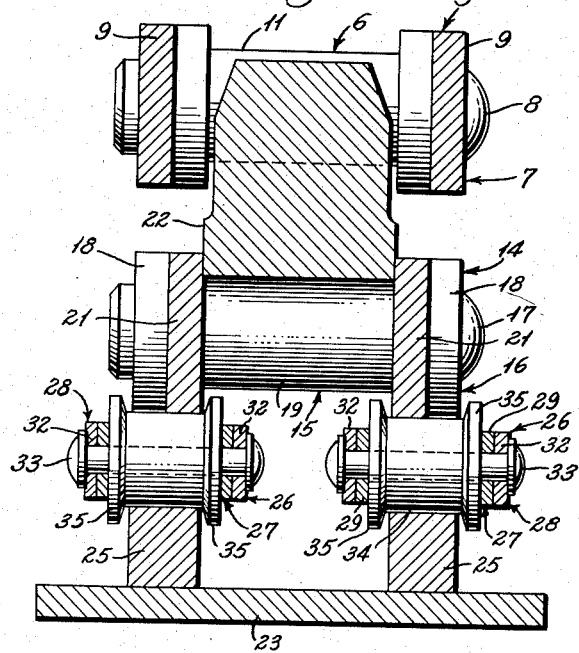
Figure 3:
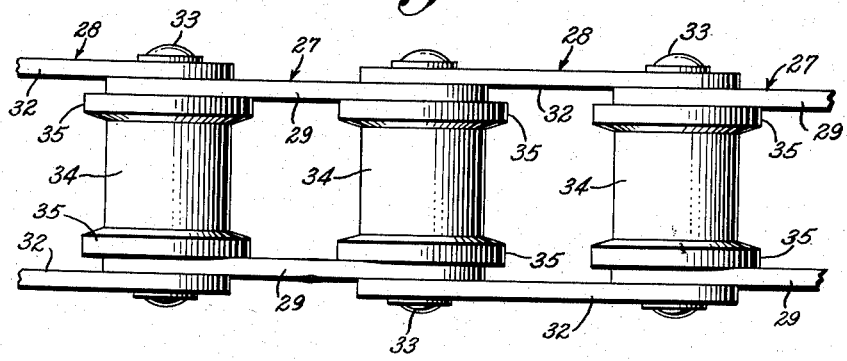

In the accompanying drawings, forming a part of this specification and in which like reference characters are employed to designate like parts throughout the same, Figure 1 is a fragmentary side elevational view of a caterpillar type drive embodying the invention, Figure 2 is a vertical sectional view taken on line 2—2 of Fig. 1, and Figure 3 is a fragmentary top plan view of the back-up chain illustrated in Figs. 1 and 2.

In the drawings, wherein for the purpose of illustration is shown a preferred embodiment of the invention, and first particularly referring to Fig. 1, reference character 5 designates a conventional endless conveyor chain formed of alternately arranged inside links 6 and outside links 7. Adjacent links 6 and 7 of the chain 5 have their end portions overlapped and connected by pins 8 which extend between side bars 9 of the outside links and through bushings 11 carried by the inside links 6. A top supporting plate 12 forms a part of each inside link 6. A drive pocket is formed between the two side bars 9 of each outside link 7 and the bushings 11 of its two adjacent inside links 6.

Positioned in vertical alignment with the conveyor chain 5 are a pair of longitudinally spaced sprockets 13 one of which is driven by any suitable prime mover, not shown. A drive chain 14, having a pitch equal to or slightly less than that of the conveyor chain 5, is trained over the sprockets 13. The drive chain 14 is formed of alternately arranged inside links 15 and outside links 16, the adjacent end portions of which are overlapped and connected by pins 17 which pass through the side bars 18 of the outside links 16 and through bushings 19 which extend between and connect the side bars 21 of the inside links 15. A dog 22 is formed on each inside link 15 and is shaped for movement into the drive pockets of the conveyor chain 5 to engage the bushing 11 at one end of each drive pocket and to thereby impart movement to the conveyor chain 5.

As illustrated in Figs. 1 and 2, a stationary support plate 23 is mounted in any suitable manner adjacent the inner face of the active run of the drive chain 14 and extends longitudinally between the sprockets 13. The ends of the support plate 23 are arcuately formed to provide guides 24, the purpose of which will be later described. Mounted on the upper or outer face of the plate 23 with the same lateral spacing therebetween as that of the side bars 21 of the drive chain 14 are a pair of longitudinally extending guide rails 25 having their opposite end portions inclined downwardly toward the ends of the support plate 23.

Two back-up chains 26 are trained around the support plate 23 and its guides 24 to extend along and bear upon the guide rails 25. The back-up chains 26 are of identical construction and, as illustrated in Figs. 2 and 3, each is formed with alternate inside links 27 and outside links 28. The inside links 27 are each formed with a pair of laterally spaced side bars 29 and outside links 28 are also formed with a pair of laterally spaced side bars 32 the opposite end portions of which are arranged in overlapped relationship with end portions of the side bars 29 of the adjacent inside links 27 and are connected by chain pins 33 which extend in loosely fitted relationship through aligned openings in the overlapped end portions of the side bars 29 and 32.

Rotatably mounted on each pin 33 is a roller 34 having guide flanges 35 at its opposite end portions. The guide flanges 35 are so spaced that the surfaces of the rollers 34 between the flanges will engage the outer surface of the associated guide rail 25 and the flanges will prevent lateral displacement of the rollers relative to said rail. The peripheries of the guide flanges 35 engage the curved guides 24 at the opposite ends of the support plate 23 to train the back-up chains 26 through continuous paths.

As illustrated in Fig. 1, the elevation of the guide rails 25 and the diameter of the rollers 34 are such that the rollers will engage and thereby support or back-up the side bars 18 and 21 of the portion of the drive chain 15 that has its lugs 22 in actual driving engagement with the conveyor chain 5. It will be noted that the pitch of each back-up chain 26 is approximately one-half that of the drive chain 14 so that at least two, and usually three, of the rollers 34 will engage the side bars 18 or 21 of each link of the portion of the drive chain that is actually in driving engagement with the conveyor chain.

Considering now the manner in which the back-up chains 26 function to eliminate all rubbing frictional engagement between the back-up structure and the drive chain 14, it will be readily apparent that the movement imparted to the drive chain will cause its side bars 18 and 21 to roll along the aligned peripheries of the rollers 34 of the two back-up chains. This rolling engagement between the rollers 34 and the side bars 18 and 21 will cause the back-up chains to travel around the stationary remainder of the back-up structure. It will also be apparent that all of the rollers 34 moving in engagement with the side bars 18 and 21 and the guide rails 25 will have the same linear velocity so that there will be no tendency for the distance between adjacent rollers to be increased or decreased. The journal friction of the rollers 34 on their supporting pins 33, therefore, is maintained at a very low and substantially negligible value.

It is to be understood that the form of this invention herewith shown and described is to be taken as the preferred example of the same, and that various changes in the shape, size, and arrangement of parts may be resorted to without departing from the spirit of the invention or the scope of the subjoined claims.

Having thus described the invention, I claim:

1. In a caterpillar type drive for a conveyor chain wherein a conveyor chain is to be driven by a drive chain dogs engageable with the conveyor chain while traveling through the active run of the drive chain, the combination therewith of an anti-friction back-up for the active run of the drive chain, comprising a stationary support mounted adjacent to and extending along the active run of said drive chain, and an endless articulate roller assembly trained around said support for movement in rolling engagement with both said drive chain and said support.

2. In a caterpillar type drive for a conveyor chain wherein a conveyor chain is to be driven by a drive chain having dogs engageable with the conveyor chain while traveling through the active run of the drive chain, the combination therewith of an anti-friction back-up for the active run of the drive chain, comprising a stationary support mounted adjacent to and extending along the active run of said drive chain, and a pair of endless back-up roller chains trained around said support for movement in rolling engagement with both said drive chain and said support.

3. In a caterpillar type drive for a conveyor chain wherein a conveyor chain is to be driven by a drive chain having dogs engageable with the conveyor chain while traveling through the active run of the drive chain, the combination therewith of an anti-friction back-up for the active run of the drive chain, comprising a stationary support plate mounted adjacent to and extending along the active run of said drive chain, a guide rail mounted on said support plate and extending in parallel relationship with the active run of said drive chain, an endless back-up chain trained around said support plate and guide rail, and a plurality of rollers mounted at uniformly spaced points along said back-up chain for movement therewith in rolling engagement with the drive chain and the guide rail.

4. In a caterpillar type drive for a conveyor chain wherein a conveyor chain is to be driven by a drive chain having each of its links formed with laterally spaced side bars, said drive chain having dogs for driving engagement with the conveyor chain while traveling through the active run of the drive chain, the combination therewith of an anti-friction back-up for the active run of the drive chain, comprising a stationary support mounted adjacent the inner face of said drive chain along the active run thereof, an endless back-up chain trained around said support for movement through a run in parallel relationship with the active run of said drive chain, and a plurality of rollers rotatably mounted at spaced points along said back-up chain for movement therewith between and in rolling engagement with said drive chain and said support, said rollers being so spaced that at least two of the same engage each link of the drive chain during movement of the drive and back-up chains through their parallel runs.

5. In a caterpillar type drive for a conveyor chain wherein a conveyor chain is to be driven by a drive chain having each of its links formed with laterally spaced side bars, said drive chain having dogs extending outwardly from its outer face for engagement with the conveyor chain while traveling through the active run of the drive chain, the combination therewith of an anti-friction back-up for the active run of the drive chain, comprising a stationary support mounted adjacent the inner face of said drive chain along the active run thereof, a pair of guide rails mounted on said support in opposed parallel relationship with the side bars on opposite sides of the drive chain, a pair of back-up chains trained around said support for movement through runs between the two guide rails and the opposed side bars of the drive chain, and a plurality of rollers mounted at uniformly spaced points along each back-up chain for movement therewith between and in rolling engagement with the associated guide rail and its opposed side bars.

References Cited in the file of this patent

UNITED STATES PATENTS

| | | |
|---|---|---|
| 1,699,764 | Solem | Jan. 22, 1929 |
| 2,530,786 | Rose | Nov. 21, 1950 |
| 2,609,086 | McBride | Sept. 2, 1952 |
| 2,684,753 | Kolbe et al. | July 27, 1954 |

UNITED STATES PATENT OFFICE

CERTIFICATE OF CORRECTION

Patent No. 2,868,356                                          January 13, 1959

George W. Haaff

It is hereby certified that error appears in the printed specification of the above numbered patent requiring correction and that the said Letters Patent should read as corrected below.

Column 3, line 26, after "drive chain" insert -- having --.

Signed and sealed this 14th day of April 1959.

(SEAL)
Attest:

KARL H. AXLINE
Attesting Officer

ROBERT C. WATSON
Commissioner of Patents